US009445960B2

(12) United States Patent
Abughaida

(10) Patent No.: US 9,445,960 B2
(45) Date of Patent: Sep. 20, 2016

(54) STAIR-CLIMBING WHEELCHAIR

(71) Applicant: Amer Abughaida, Ann Arbor, MI (US)

(72) Inventor: Amer Abughaida, Ann Arbor, MI (US)

(73) Assignee: PELICO LLC, Ann Arbor, MI (US)

(*) Notice: Subject to any disclaimer, the term of this patent is extended or adjusted under 35 U.S.C. 154(b) by 0 days.

(21) Appl. No.: 14/616,585

(22) Filed: Feb. 6, 2015

(65) Prior Publication Data

US 2015/0216748 A1 Aug. 6, 2015

Related U.S. Application Data

(60) Provisional application No. 61/936,328, filed on Feb. 6, 2014.

(51) Int. Cl.
*A61G 5/06* (2006.01)
*A61G 5/10* (2006.01)
*B60B 1/00* (2006.01)
*A61G 5/02* (2006.01)
*A61G 5/08* (2006.01)
*B60B 9/00* (2006.01)

(52) U.S. Cl.
CPC ............... *A61G 5/061* (2013.01); *A61G 5/026* (2013.01); *A61G 5/068* (2013.01); *A61G 5/10* (2013.01); *B60B 1/006* (2013.01); *A61G 5/065* (2013.01); *A61G 2005/0866* (2013.01); *A61G 2005/1078* (2013.01); *B60B 9/00* (2013.01); *B60Y 2200/84* (2013.01)

(58) Field of Classification Search
CPC .................................. A61G 5/06; A61G 5/061
See application file for complete search history.

(56) References Cited

U.S. PATENT DOCUMENTS

| 3,179,431 | A |   | 4/1965  | Pikl |
|-----------|---|---|---------|------|
| 3,214,184 | A | * | 10/1965 | Kemm ................... A61G 5/061 280/11 |
| 3,226,128 | A |   | 12/1965 | Grier |
| 3,226,129 | A |   | 12/1965 | McKinley |
| 3,227,465 | A |   | 1/1966  | Massie |

(Continued)

FOREIGN PATENT DOCUMENTS

DE    102009052253 A1    5/2011

OTHER PUBLICATIONS

PCT International Searching Authority, Written Opinion of the International Searching Authority, May 18, 2015, pp. 1-5, ISA/US, Alexandria, Virginia, United States.

(Continued)

*Primary Examiner* — Kevin Hurley
(74) *Attorney, Agent, or Firm* — Hojka Qadeer, LLC; Umair A. Qadeer

(57) ABSTRACT

A stair-climbing wheelchair comprising deformable main rear wheels comprising lockable suspension elements and front supporting wheels comprising lockable suspension elements is disclosed herein. The wheelchair may operate in at least two modes, a standard mode and a stairs mode. In standard mode, the wheelchair may operate similar to an ordinary basic wheelchair, with suspension elements locked and rigid. In stairs mode, the suspension elements may be activated and the rear wheels may be deformable to readily negotiate an uneven surface, wherein the front suspension elements may be elongated to provide balance while climbing. The operating principles behind the functionality of the device disclosed herein may also be applied to other devices used to negotiate stairs, such as devices used to move heavy appliances on stairs.

3 Claims, 5 Drawing Sheets

(56) References Cited

U.S. PATENT DOCUMENTS

| | | |
|---|---|---|
| 3,269,478 A | 8/1966 | Joslyn |
| 2004/0066019 A1 | 4/2004 | Yamabe |
| 2012/0217713 A1 | 8/2012 | Molnar |

OTHER PUBLICATIONS iBOT, Wikipedia [retrieved on Oct. 5, 2015]. Retrieved from the Internet: <URL: https://en.wikipedia.org/wiki/IBOT>.

* cited by examiner

STAIR-CLIMBING WHEELCHAIR

CROSS-REFERENCE TO RELATED APPLICATIONS

This application claims priority to U.S. Provisional Patent Appl. No. 61/936,328, filed on Feb. 6, 2014, the disclosure of which is incorporated herein in its entirety by reference.

BACKGROUND

1. Field of the Invention

This disclosure relates to a wheelchair apparatus capable of climbing and negotiating stairways and curbs.

2. Description of the Related Art

There has long been an interest in wheelchairs capable of climbing stairs and curbs as a means of imparting greater mobility, and hence self-sufficiency, to wheelchair-bound persons. During the 1950s and 1960s, a design contest sponsored by the National Inventors Council and the President's Committee on the Employment of the Physically Handicapped generated significant interest among inventors in stair-climbing wheelchairs. The contest was established in recognition of the fact that no practical stair-climbing wheelchair existed.

Examples of designs developed during this period are shown in U.S Pat. No. 3,226,128 to Grier and U.S Pat. No. 3,269,478 to Joslyn.

Grier discloses fore and aft skids attached to chair drive wheel axles interior to the wheels. A gripping means holds the chair on the stairs while the skids move the chair up the stairs, wherein the skids rest on the nose of a given step at intervals. Grier's design is susceptible to slippage and often puts the operator in various unstable positions involving precarious balance of the chair.

Joslyn discloses a chair comprising a pair of vertically-oriented, hydraulically-operated lifting legs fore and aft on each side of the chair. The legs are interconnected and are pivoted at on the chair at their top ends. The cylinders lift the chair up a stair, and the operation is repeated until the chair negotiates the stairs. The lifting apparatus is relatively large and awkward and must be attached exterior to the wheels, resulting in a wheelchair that is extra wide and thus of limited utility.

More recent examples of stair-climbing wheelchairs include the iBOT Mobility System, an electronic stair-climbing wheelchair which has received FDA approval. See http://www.ibotnow.com. Although the iBOT Mobility System offers significant advantages over previous designs, it is expensive and thus not a feasible option for a large percentage of wheelchair-bound individuals.

Currently known designs of stair-climbing wheelchairs can be grouped into electrically-powered and human-powered chairs. Electrically-powered stair-climbing wheelchairs generally comprise batteries, an electric motor, controllers, and/or various actuators, resulting in an expensive and heavy apparatus that is generally unavailable to those without significant financial resources. Human-powered stair-climbing wheelchairs generally comprise a large number of moving parts, resulting in a complicated apparatus that is difficult to maintain and transport.

Thus there exists a significant need for a light, simple, durable stair-climbing wheelchair with relatively few moving parts involved in the stair-climbing mechanism.

SUMMARY

A stair-climbing wheelchair comprising deformable main rear wheels comprising lockable suspension elements and front supporting wheels comprising lockable suspension elements is disclosed herein. The wheelchair may operate in at least two modes, a standard mode and a stairs mode. In standard mode, the wheelchair may operate similar to an ordinary basic wheelchair, with suspension elements locked and rigid. In stairs mode, the suspension elements may be activated and the rear wheels may be deformable to readily negotiate an uneven surface, wherein the front suspension elements may be elongated to provide balance while climbing. The operating principles behind the functionality of the device disclosed herein may also be applied to other devices used to negotiate stairs, such as devices used to move heavy appliances on stairs.

DETAILED DESCRIPTION OF THE PREFERRED EMBODIMENTS

Design

Embodiments of the stair-climbing wheelchair disclosed herein mimic the design of ordinary wheelchairs, with two large rear wheels and two small front wheels. The stair-climbing wheelchair is human-powered, and may be operated by either the occupant or a second person external operator. The disclosed wheelchair may be folded for ease of storage and transportation.

In some embodiments, the wheelchair may have two modes, a standard mode and a stairs mode, wherein the operator can switch between the modes using a interface such as a lever, button, or other switch. In standard mode, the wheelchair operates in almost the same way as a basic wheelchair, wherein all wheels are free running The braking system may be, for example, a manual braking system similar to the brake system frequently used in basic wheelchairs that is attached to the main rear wheels or may be an internal system embedded within one or more wheels. In stairs mode, the suspension system is activated and the wheels are adjusted to negotiate an uneven surface as required when climbing stairs. The rear wheels may comprise a number of suspension elements connected to rigid pieces or may alternatively comprise a flexible tire connecting all suspension elements together. When one area of the rear wheel is in contact with the ground and force is exerted thereupon, the surrounding suspension elements may compress, distributing weight on multiple suspension elements, thus reducing the load on each suspension element and thereby improving durability of the apparatus.

Figure 1:
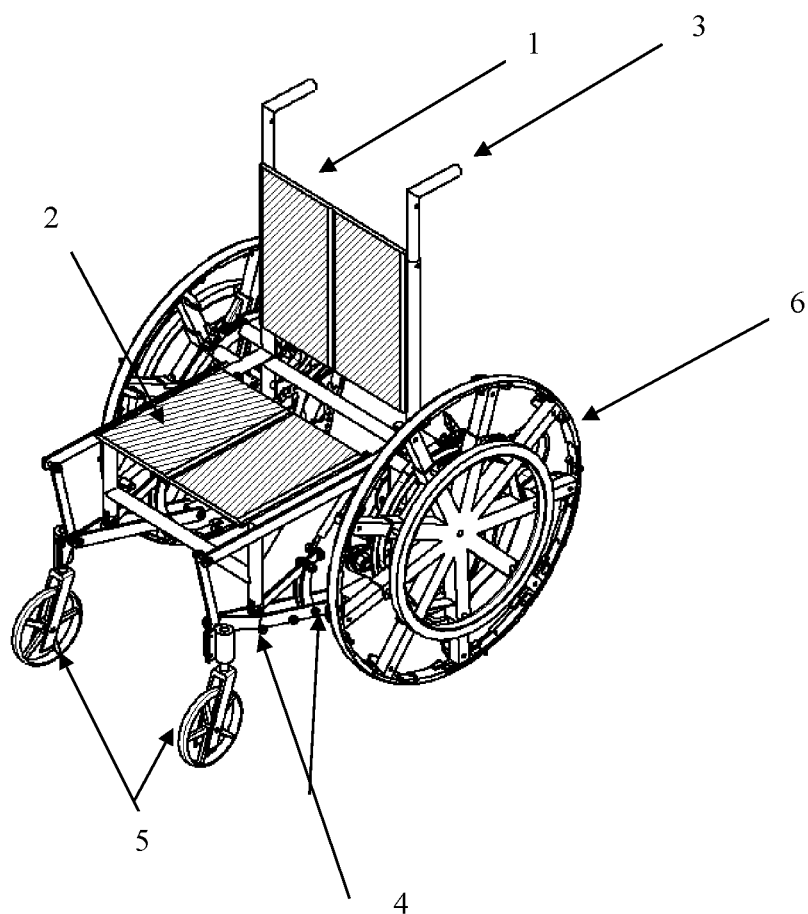
FIG. 1 shows an embodiment of the wheelchair in standard mode.

FIG. 1 illustrates a side view of an embodiment of the collapsible stair-climbing wheelchair. The wheelchair includes a back rest (1) which may be foldable, a seat portion (2), a push handle (3), a front wheel assembly base (4), two front wheels (5), and two rear wheels (6).

In some embodiments, other accessories may be added to the wheelchair for improved occupant comfort. Such accessories may include arm rests, a foot rest, a head rest, or other similar comfort-providing features.

Figure 2:
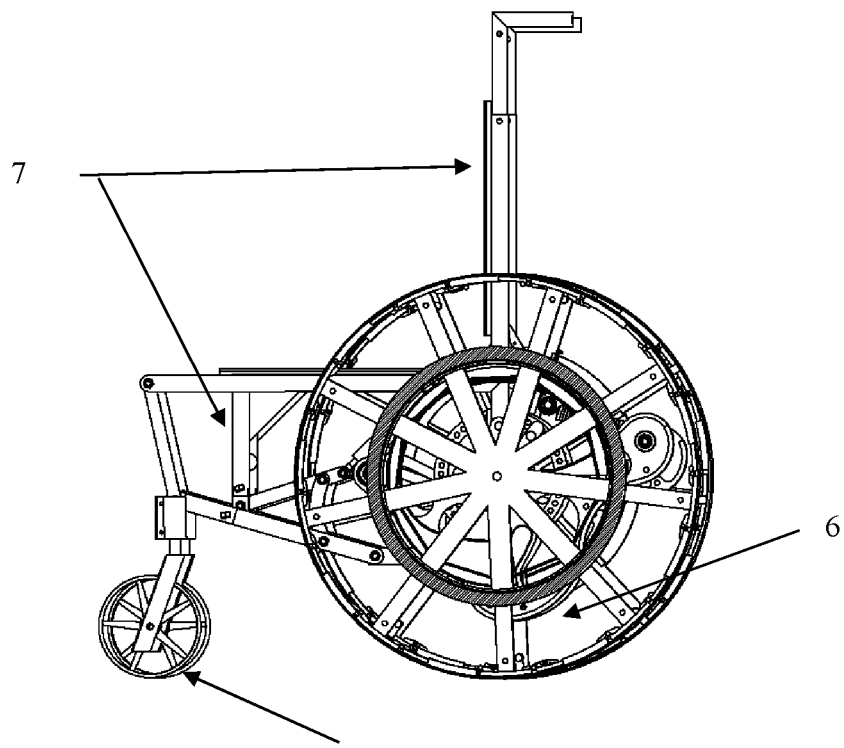
FIG. 2 shows a side view of the embodiment shown in FIG. 1.

FIG. 2 illustrates a left side view of an embodiment of the wheelchair, which includes a frame (7), front wheels (5), and one rear wheel (6).

Figure 3:
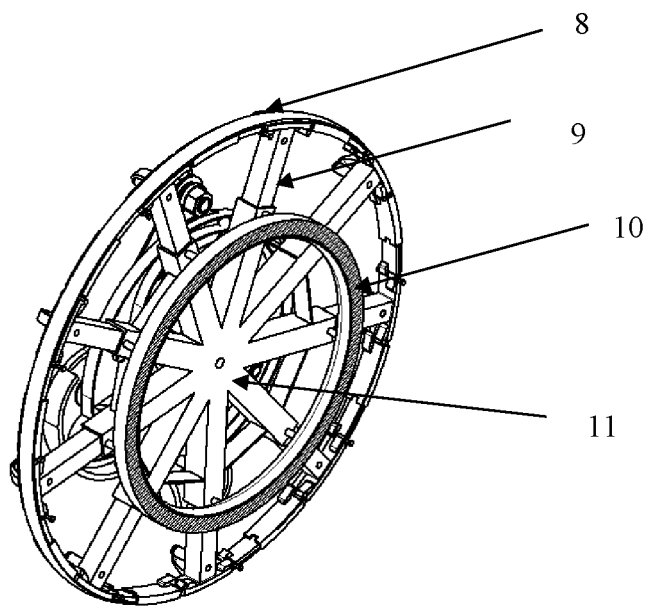
FIG. 3 shows an embodiment of the rear wheel in standard mode.

FIG. 3 illustrates the rear wheel (6), which includes a flexible tire (8), spokes (9), a handle (10), and a wheel frame (11).

Figure 4:
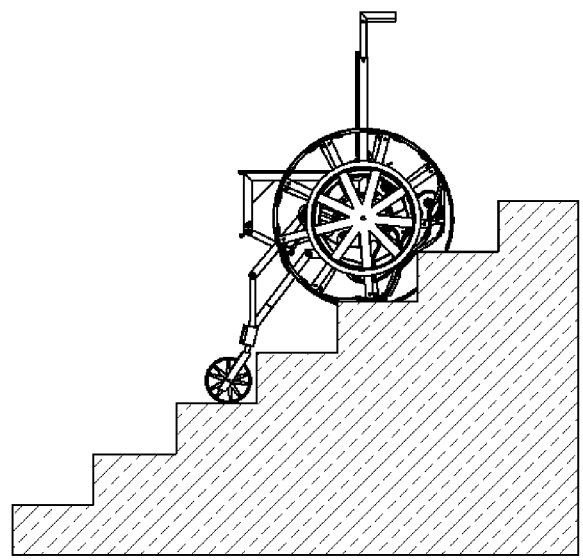
FIG. 4 shows an embodiment of the wheelchair in stairs mode.

FIG. 4 shows how rear wheel deformation and front wheel drop may assist in maintaining an approximately level seat position while traversing stairs.

Figure 5:
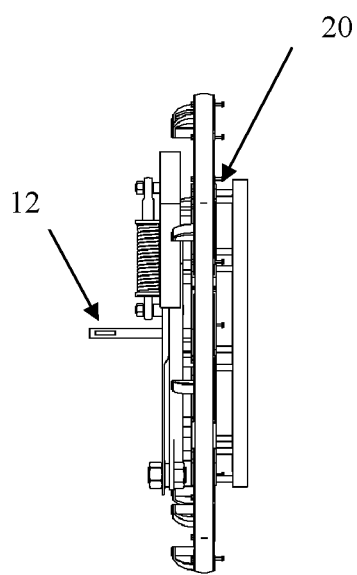
FIG. 5 shows a side view of an embodiment of the rear wheel.

FIG. 5 illustrates a side view of the wheelchair, which includes a shaft (12) that connects the rear wheel (6) to the frame (7).

Figure 6:
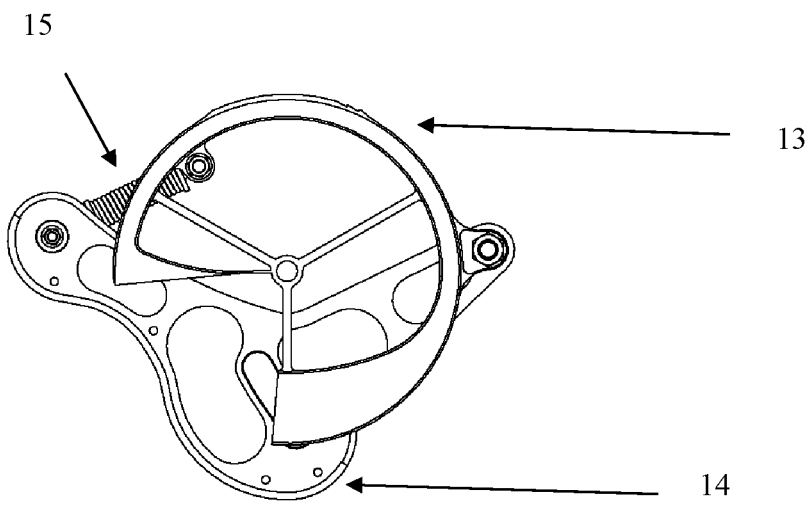
FIG. 6 shows the mechanism of one rod of the rear wheel in compression mode during the operation of the embodiment in FIG. 4.

FIG. 6 illustrates an assembly that allows the spokes to compress inward at only one corner, the lower left corner as shown, which includes a fixed cam (13), a rocking cam (14), and a spring (15).

Figure 7:
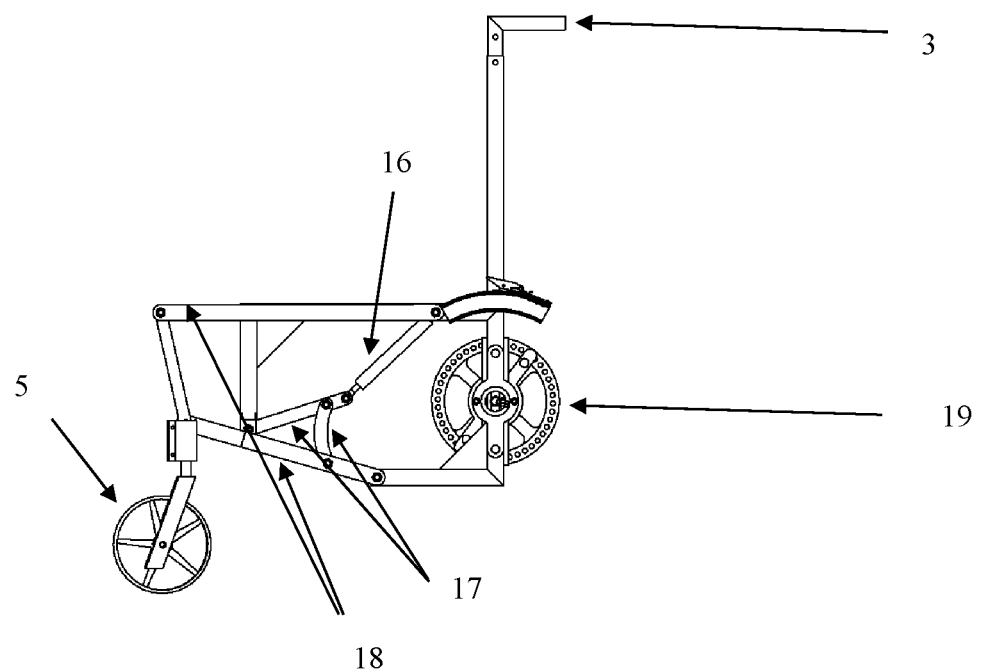
FIG. 7 shows a side view of an embodiment of the front wheel assembly, front wheel, force stabilizer, strut, and brake in standard mode.

FIG. 7 illustrates a view of one side of the wheelchair, which includes a lockable strut (16), a force stabilizer (17), which may comprise a two-link configuration, a front wheel assembly (18), which may comprise a four-link configuration, a front wheel (5), and a brake (19) that connects to the rear wheel.

Figure 8:
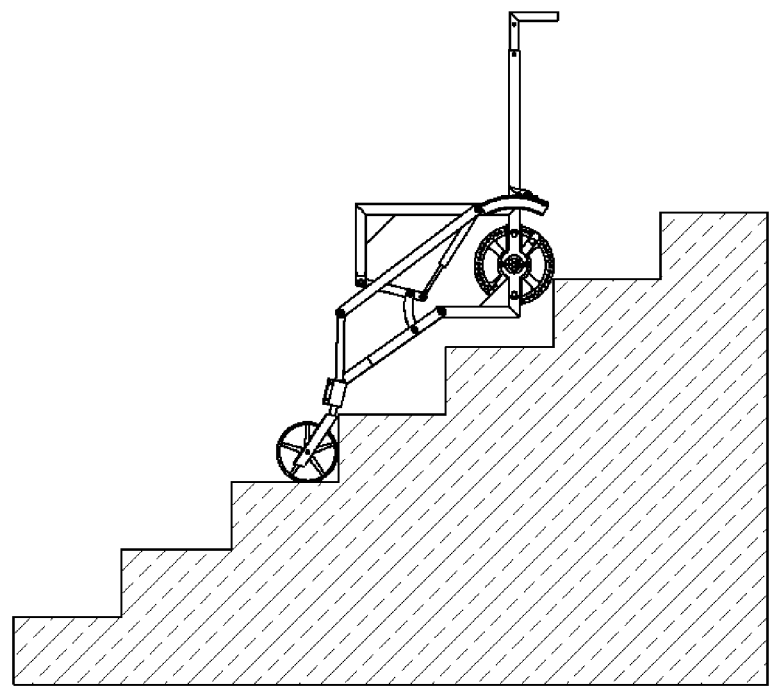
FIG. 8 shows a side view of an embodiment of the front wheel assembly, front wheel, force stabilizer, strut, and brake in stairs mode.

FIG. 8 shows an embodiment of the front wheel assembly (18), the front wheel (5), the force stabilizer (17), the strut (16), and the brake (19) on stairs.

Figure 9:
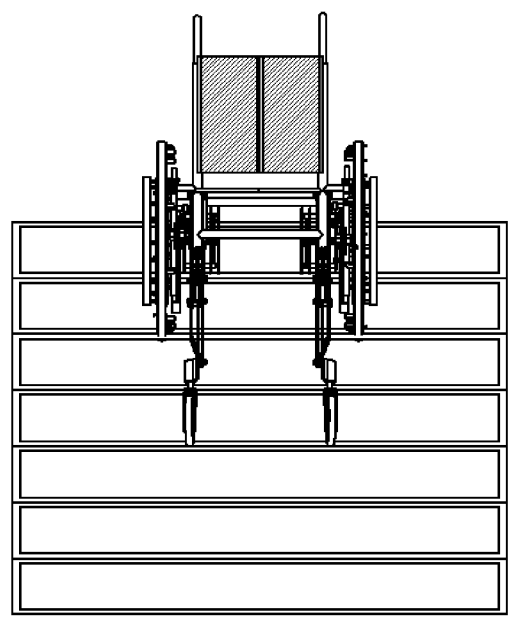
FIG. 9 shows a front view of an embodiment of the wheelchair in stairs mode.

FIG. 9 illustrates a front view of the wheelchair on stairs.

The back rest (1) and seat portion (2) are attached to a frame (7). The front wheel assembly base (4) may be welded to or otherwise securely attached to the frame (7) by joints. Accessories such as an arm rest, a foot rest holder, or a head rest may be welded to or otherwise securely attached to the frame (7). The frame may be rigid, as shown in FIGS. 1, 2, 4, and 7-9. Alternatively, the frame (7) and back rest (1) may be collapsible. Crossbars connected to the frame (7) through joints and which may be connected together by a rod would allow the frame (7) to collapse. Collapsibility of the wheelchair would provide ease of storage and transportation.

In some embodiments, the rear wheel (6) may be connected to the frame (7) by a shaft (12). The rear wheel (6) may comprise a flexible tire (8), spokes (9), a handle (10), a wheel frame (11), and a fixed cam (13). The rear wheel (6) may further comprise a rocking cam (14), and one or more springs (15). In some preferred embodiments, a brake (19) may be connected to the rear wheel (6), wherein the brake may comprise, for example, a centrifugal clutch that locks when the wheel exceeds a pre-defined velocity or acceleration or wherein the brake may comprise a normally closed braking system that is only released when the operator releases it.

In some embodiments, the flexible tire (8) may comprise a high friction material to maximize friction with the floor or stairs surface and may be connected with two or more spokes (9) via grooves. The handle (10) may be connected to the wheel frame (11) by rigid connectors (20). The handle (10) may be ergonomic with smooth edges and may be covered by a low impact material with good friction such as rubber to improve usability by the occupant-operator. The wheel frame (11) may be connected to the shaft (12) and may allow each spoke (9) to independently slide inward toward the center of the wheel. The shaft (12) may be locked into the frame for safety reasons. The spokes (9) may have two cam followers that will follow the fixed cam (13) and the rocking cam (14). In some preferred embodiments, the one or more springs (15) connect the fixed cam (13) to the rocking cam (14). The one or more springs (15) are used to maintain tension on the rocking cam (14) and to absorb the impact when the rear wheel drops or climbs from one stair step to another. During the rotation of the rear wheel, the fixed cam (13) does not rotate and rocking cam (14) does not substantially rotate. The expansion and contraction of the one or more springs causes the rocking cam (14) to rock. This allows the rear wheel (6) to adjust according to the pitch angle of the stairs and maintain the appropriate pressure on the spoke (9) for that portion of the ascent or descent of the rear wheel (6). In some preferred embodiments, the fixed cam (13) maintains complete or nearly complete extension of the spokes (9) for about two thirds of a single rotation of the rear wheel, while the rocking cam (14) allows the spokes (9) that are in partial or complete contact with the solid surface of the stairs to slide inward to varying degrees to allow the wheel to traverse the steps.

The front wheel assembly (18) may be connected to the frame (7) and, in some preferred embodiments, may utilize a four-link configuration wherein two links are connected to the frame and a coupler is connected to the front wheel (5). This allows the front wheel (5) to travel in an elliptical manner. This elliptical movement of the front wheel (5) allows the wheelchair to negotiate stairs by preventing the front wheel (5) from getting stuck on a particular step. In some preferred embodiments, the front wheel assembly (18) may be connected to a force stabilizer (17), wherein the force stabilizer (17) is connected to a strut (16). In some preferred embodiments, the strut (16) may be a lockable strut. The force stabilizer is used to compensate for the varying forces applied by the extension and contraction of the strut (16).

The front wheel assembly may comprise two links connected to the frame (7), a coupler, and a wheel base. The front wheel (5) may be connected to the wheel base by a rod and may be free running.

In some embodiments, an interface connected to the wheelchair such as a lever, button, or other switch may allow the operator to switch between standard mode and stairs mode. The interface may be connected to both the front and rear wheel assemblies and to the braking system by connectors such as cables. When the wheelchair is in stairs mode, the spokes (9) may preferably unlock and activate the system of cams and other components described above which allows the wheelchair to traverse stairs. The brake (19) connected to the rear wheel (6) may preferably activate and may be normally applied, but it may also be momentarily unapplied by the wheelchair occupant-operator or other second person external operator. The strut (16) may preferably be lockable and may preferably unlock and thus allow the front wheel assembly (18) to move.

Operation

In some embodiments, all the wheels may be manually operated when the wheelchair is in standard mode. The wheelchair may be switched to stairs mode by the operator using, for example, a lever, button, or other switch, thereby unlocking the rear wheel spokes and causing the rear wheels to start to deform even when on a flat surface. The front wheel suspension system may also thereby be unlocked, enabling it to travel so that it can negotiate the distance between steps on stairs. However, the wheelchair may still be usable on flat surfaces in this mode. Safety brakes such as a disk brake may preferably be connected to at least one rear wheel, thereby allowing the rear wheel to move only when the wheelchair operator momentarily releases the brake. This increases safety while climbing or descending stairs.

The handle on the rear wheel may comprise a solid ring smaller than the wheel to allow some wheel deformation without interference. The handle may be ergonomically designed to help the occupant-operator apply maximum force. One or more connectors may connect the handle to the wheel frame. In some preferred embodiments, the connector may preferably be smooth and rounded rather than angular to limit the impact forces on the occupant-operator's hands, and may be covered with an elastic or other soft material such as rubber for impact absorption and to provide the occupant-operator with better grip.

In some embodiments, the occupant may climb stairs facing downwards such that the rear wheels are on the higher steps to maintain a low center of gravity close to the geometric center of the wheelchair and to maintain the seat in an approximately level position. The approximately level seat position may be horizontal or may be slightly inclined according to the occupant's preference. FIG. 4 shows how rear wheel deformation may assist in maintaining an approximately level seat position. The center of gravity is preferably not directly on the rear wheel and may preferably be shifted forward to reduce the risk of falling backward. This generally will lead to better weight distribution on the four wheels and thus improve the durability of the suspension elements.

In some embodiments, the front wheel assembly may comprise a four-link configuration. FIG. 7 shows the front wheel negotiating a stair step. The front wheel rotates inward toward the step, which helps to increase the vertical progression of the front wheel assembly, thereby increasing the vertical difference between the contact patch of the rear wheels and the contact patch of the front wheels, wherein the contact patch of a wheel is the part of the wheel which contacts the stair or other solid surface. This assists in maintaining the seat in an approximately level position.

FIG. 8 shows an embodiment of the device with a front wheel that is large enough to eliminate the possibility of the front wheel assembly interfering with the steps while climbing and that is not too large to fit on small steps.

In some embodiments, the rear wheels may be packaged as a separate module from the frame and other components of the wheelchair so that the rear wheels may be easily removed from the frame, thus improving portability and transportability of the wheelchair.

When the operator wants to return to standard mode, the operator may switch the interface to standard mode, thereby releasing the brake from the rear wheels, returning the front wheel suspension system to its original height and locking it, and returning the rear wheel spokes to their fully extended height and locking them. It may take a few rotations of the wheels to return completely from stairs mode to standard mode.

The previous description of the disclosed embodiments is provided to enable any person skilled in the art to make or use the invention disclosed herein. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. All references cited herein are expressly incorporated by reference.

What is claimed is:
1. A stair-climbing wheelchair comprising:
 a. a frame;
 b. a back rest;
 c. a seat;
 d. a push handle;
 e. two rear wheels;
 f. one or two front wheels; and
 g. at least one flexible front suspension system;
wherein each rear wheel comprises a flexible tire, two or more spokes, a handle, a wheel frame, and a fixed cam, wherein each rear wheel is connected to the frame by a shaft, and wherein a brake may be connected to one or both of the rear wheels.

2. The wheelchair of claim 1 further comprising a rocking cam and one or more springs, wherein the expansion and contraction of the one or more springs causes the rocking cam to rock, thereby allowing the rear wheel to adjust according to the pitch angle of the stairs.

3. The wheelchair of claim 1 wherein the fixed cam maintains complete or nearly complete extension of the spokes for about two thirds of a single rotation of the rear wheel and the rocking cam allows the spokes that are in partial or complete contact with the solid surface of the stairs to slide inward to varying degrees, thereby allowing the wheel to traverse the steps.

\* \* \* \* \*